Sept. 17, 1940.　　　D. KNUDSEN　　　2,215,005
PISTON AND PISTON RING
Filed Feb. 16, 1940　　　2 Sheets-Sheet 1
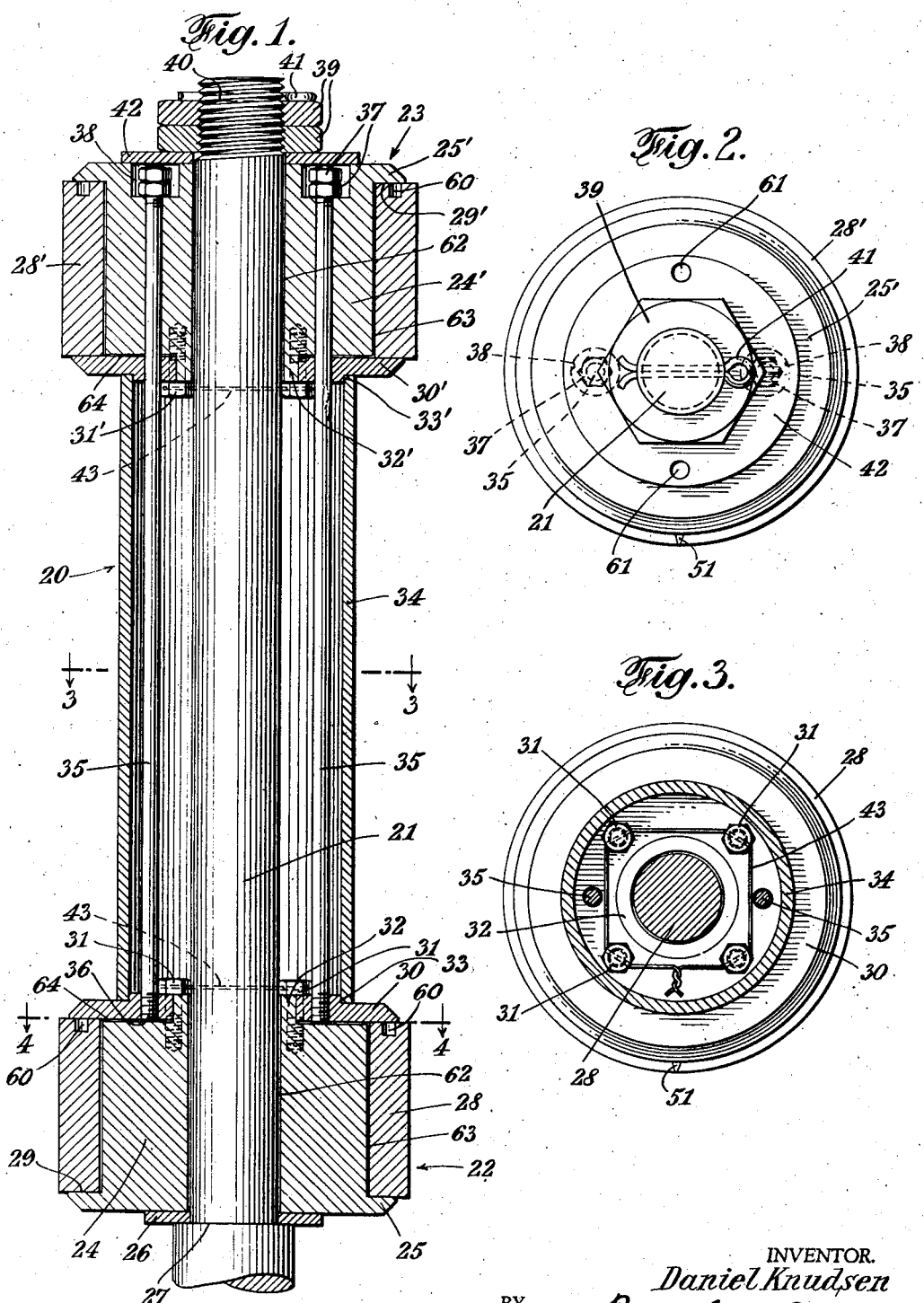
INVENTOR.
Daniel Knudsen
BY Peter M. Boesen
his Attorney.

Sept. 17, 1940. D. KNUDSEN 2,215,005
PISTON AND PISTON RING
Filed Feb. 16, 1940 2 Sheets-Sheet 2
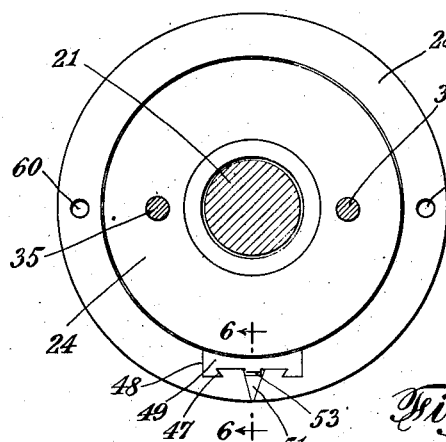
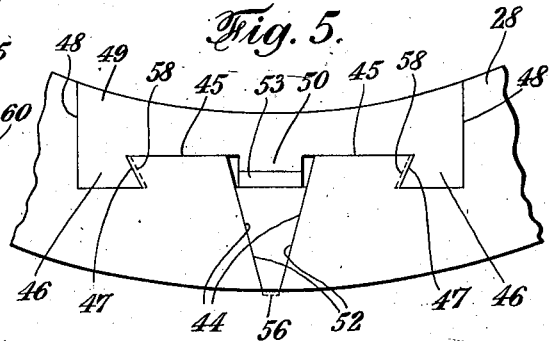
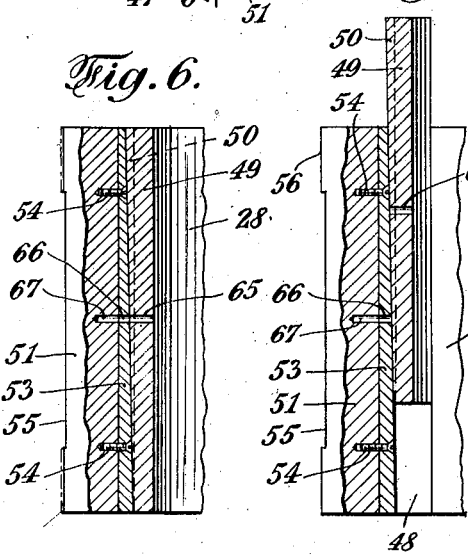
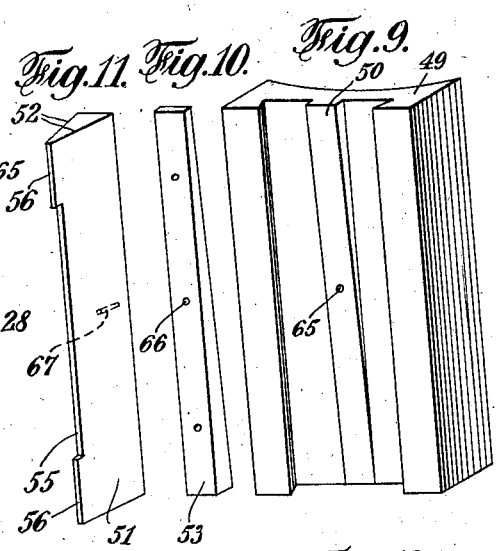
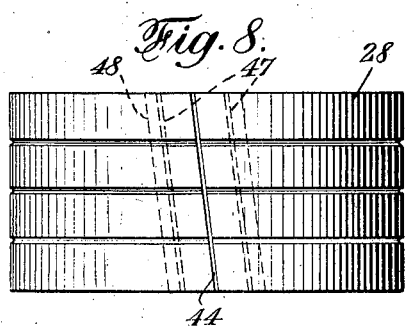
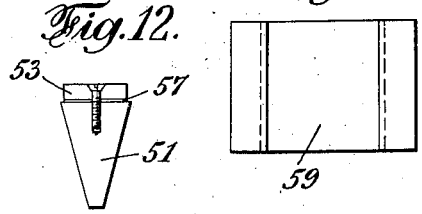
INVENTOR.
Daniel Knudsen.
BY
his Attorney Patented Sept. 17, 1940

2,215,005

UNITED STATES PATENT OFFICE 2,215,005

PISTON AND PISTON RING

Daniel Knudsen, Staten Island, N. Y.

Application February 16, 1940, Serial No. 319,182

3 Claims. (Cl. 309—4)

This invention relates to new and useful improvements pertaining to pistons, and more especially to pistons of larger dimensions, such as those used in engines.

Another object of my invention is to provide an easy way of assembling in cases, where the piston is provided with several piston heads.

A still further object is to provide simplified means for the fitting and locking of the piston rings.

With the above and other objects in view, this invention consists of the novel features of construction, combination and arrangement of parts, hereinafter fully described, claimed and illustrated in the accompanying drawings, forming part of this application, and in which similar characters of reference indicate corresponding parts in all views, and in which—

Figure 1 is a substantially transverse, vertical sectional view of my piston assembly.

Figure 2 is a top plan view of Figure 1.

Figure 3 is a transverse section, taken on the line 3—3 of Figure 1.

Figure 4 is a transverse section, taken on the line 4—4 in Figure 1.

Figure 5 is a top plan fragmentary view, showing a lock and wedge construction on an enlarged scale.

Figure 6 is a vertical transverse sectional view, taken on the line 6—6 of Figure 4.

Figure 7 is a similar view as shown in Figure 6, but with a part thereof in a different position.

Figure 8 is a side elevational view of a piston ring, as employed in my invention.

Figure 9 is an elevational perspective view of a ring keeper and wedge.

Figure 10 is a similar view of a wedge member; and

Figure 11 is a similar view of a sealing member.

Figure 12 is a top plan view of the parts shown in the Figures 10 and 11, combined.

Figure 13 is a side elevational view of a temporary locking member.

Referring more particularly to the drawings, 20 indicates my improved piston assembly; the latter comprises a piston rod 21 on which is mounted a lower piston head 22, and an upper piston head 23.

The lower piston head consists of a cylindrical member 24 formed with a flange 25 thereon, which latter by means of a washer 26 rests against a shoulder 27 on the piston rod 21.

A ring member 28 is arranged upon the upper surface 29 of the flange 25; said ring member is secured to the cylindrical member 24 by means of an annular member 30, which latter, in turn, is mounted on the member 24 by means of screws 31; the annular member 30 is arranged upon a shoulder 32 of the member 24; said annular member 30 is provided with a shoulder 33 adapted to engage a spacing sleeve 34.

The upper piston head comprises a cylindrical member 24' formed with a flange 25' thereon, the lower surface of said flange 29' is adapted to engage a ring member 28', which is held against said lower surface by means of an annular member 30' fitted around a shoulder 32' on the cylindrical member 24'. The annular member 30' is secured to the cylindrical member 24' by means of screws 31'; said screws are connected together by means of a wire 43 to prevent them from falling out, if they should become loose. A shoulder 33' on the annular member 30' is adapted to engage the upper part of the spacing sleeve 34.

The piston heads 22 and 23 are both secured to the spacing sleeve 34 by means of tierods 35; said tierods are threaded into the annular member 30, as shown at 36, while the upper ends of said tierods are adapted to engage nuts 37 arranged in depressions 38 in the cylindrical member 24', and covered by a plate 42; said plate 42 serves to prevent the nuts 37 from falling out, in case they should become loose.

The piston assembly 20 comprising piston heads 22, 23 and the spacing sleeve 34, is mounted on the piston shaft 21 and secured to the latter by means of nuts 39 threaded upon the ends of said piston shaft, as shown at 40; said nuts are held in place by means of a cotter-pin 41.

Referring more particularly now to the ring members, which constitute the essence of my invention, it will only be necessary to describe one of said ring members in detail, as the numbers employed will apply alike to both of these.

As shown in the Figures 4, 5 and 8, the ring member 28 is split to provide slanting surfaces 44; upon each side of said split the ring member is formed with inwardly extending portions 45, while abutting the latter said ring member is made with reduced portions 46. The reduced portions 46 have sides 47 and 48, which form dovetails adapted to receive therein the key member 49. The slanting surfaces 44 as well as the sides 47 and 48 are vertically tapered as shown in Figure 8. The ring keeper 49 is provided with a wedge-shaped projection 50, as has been clearly shown in the Figures 6, 7 and 9. A sealing member 51 is formed with wedge-shaped sides 52 to approximately fit within the slanting surfaces 44 of the ring 28, as shown in Figure 11; the said sealing member is formed with an undercut, as indicated, or recessed portion 55. A wedge-shaped bar 53 wider at the bottom than at the top, is secured to the sealing member 51, by means of screws 54.

In assembling the relative parts, the sealing member 51 carrying the wedge-shaped bar 53 is placed in the split of the ring within the slanting sides 44. The key member 49 is inserted from the top of the ring 28 and guided by the surfaces 47 and 48. The wedge-shaped projection 50 of the key member 49 engages the inner surface of the wedge-shaped member 53 and will upon any downward movement force the sealing member 51 outwardly, thereby causing the proper, or a certain expansion of the ring 28.

The complete insertion of the key member 49 will thus form a positive locking means between the latter, the sealing member, and the ring member 28. The protruding end-portions 56 of the sealing member 51 may then be scraped down to the proper surface of the ring member 28. It may now clearly be seen in view of the herein described that through the locking means mentioned before, and sealing member 51 a positive vapor or gas proof joint is obtained.

After continuous service of the ring, it may be found necessary to insert a shim 57 between the sealing member 51 and the wedge member 53, the thickness of said shim is determined according to the wear of the ring member.

To permit more or less expansion of the ring member 28, determined by the wear of the ring, some material will have to be removed from the sides 47, as indicated by the numerals 58. While refinishing the surfaces 47, which compels the removal of the key member 49, a locking member 59 identical in shape with the ring keeper 49, but of shorter dimension and without the wedge-shaped projections 50 may, then, be inserted within the surfaces 47 and 48 for the purpose of holding the ring member 28 in expanded position.

Each piston ring may be fitted into the piston individually. For this purpose apertures 60 are provided in the rings 28 to facilitate the placing of a tool for the handling of said ring; holes 61 are formed in disk member 42, to facilitate removal of the same.

A clearance 62 is provided between the piston shaft 21 and the cylindrical members 24 and 24'; and a clearance 63 may be provided between the cylindrical members 24 and 24' and the rings 28 and 28'.

To assure a proper clamping or gripping of the rings 28 and 28' clearances 64 are allowed between the clindrical members 24 and 24' and the annular members 30 and 30'.

In the center the key member 49 is provided with a bore 65; the wedge-shaped members 53 are provided with a similar bore 66, while the sealing member 51 also has a similar bore 67, but extending only a short distance into the latter.

Before fitting the ring into the cylinder a pin or screw may be inserted through the respective openings 65, 66 and 67 to prevent the dropping of any parts into the cylindrical member, due to a too loose fitting.

It is obvious that changes may be made in the form, construction and arrangement of the several parts, as shown, within the scope of the appended claims, without departing from the spirit of the invention, and I do not, therefore, wish to limit myself to the exact construction and arrangement shown and described herein.

What I claim as new, and desire to secure by Letters Patent of the United States is:

1. A piston of the class described, comprising an upper and a lower piston head, means for spacing said piston heads, each piston head comprising a cylindrical member, the latter being formed with an annular shoulder thereon, a piston ring mounted against said annular shoulder, and an annular member attached to the inner surface of the cylindrical member, whereby to secure the piston ring in place, tierods connected to the annular member of the lower piston head, the cylindrical member of the upper piston head being formed with bores adapted to receive the upper ends of the tierods therein, and means for securing said cylindrical member to the tierods.

2. A piston of the class described, comprising an upper and a lower piston head, means for spacing said piston heads, each piston head comprising an annular member, a cylindrical member formed with an annular shoulder thereon, and being secured to said annular member, a piston ring mounted against the annular shoulder, said piston ring being formed therein with a vertically slanting slot tapering towards the periphery of said ring, inwardly extending portions arranged upon each side of said tapered slot, whereby to form dovetailed grooves, the outer sides of the latter respectively extending to the inner side of the ring and parallel with said vertically slanting slot, a key member adapted to engage said dovetailed grooves, and a wedge-shaped portion secured to said key member and made to engage the vertically slanting slot, tierods for securing the piston heads together, and means for connecting the latter to a piston shaft.

3. A piston of the class described, comprising an upper and a lower piston head, means for spacing said piston heads, each piston head comprising an annular member, a cylindrical member formed with a shoulder thereon and being secured to said annular member, a piston ring mounted against the annuler shoulder, said piston ring being formed therein with a vertically slanting slot tapering towards the periphery of said ring and having dovetailed grooves therein, a wedge-shaped member made to engage the tapered surfaces of the slot, said wedge-shaped member being formed at its narrower edge with a recess therein, a tapered member secured to said wedge-shaped member to form a unit therewith, a key member adapted to engage the aforesaid tapered member, said key member being formed with a surface tapered reversely to the latter, the said key member having portions adapted to register with the dovetailed grooves in the ring member, the end surfaces of the key member abutting the outer sides of said dovetailed grooves.

DANIEL KNUDSEN.